United States Patent
Huang et al.

(10) Patent No.: US 11,184,192 B2
(45) Date of Patent: Nov. 23, 2021

(54) PACKET TRANSMISSION

(71) Applicant: NEW H3C TECHNOLOGIES CO., LTD., Hangzhou (CN)

(72) Inventors: Liwei Huang, Beijing (CN); Wei Wang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 108 days.

(21) Appl. No.: 16/610,245

(22) PCT Filed: Apr. 18, 2018

(86) PCT No.: PCT/CN2018/083573
§ 371 (c)(1),
(2) Date: Nov. 1, 2019

(87) PCT Pub. No.: WO2018/210094
PCT Pub. Date: Nov. 22, 2018

(65) Prior Publication Data
US 2020/0059382 A1 Feb. 20, 2020

(30) Foreign Application Priority Data
May 19, 2017 (CN) .......................... 201710355369.8

(51) Int. Cl.
*H04L 12/46* (2006.01)
*H04L 12/751* (2013.01)
(Continued)

(52) U.S. Cl.
CPC ........ *H04L 12/4675* (2013.01); *H04L 12/467* (2013.01); *H04L 12/4633* (2013.01);
(Continued)

(58) Field of Classification Search
None
See application file for complete search history.

(56) References Cited

U.S. PATENT DOCUMENTS

| 8,059,658 B1 | 11/2011 | Rovner et al. |
| 2014/0269700 A1 | 9/2014 | Venkataswami et al. |

(Continued)

FOREIGN PATENT DOCUMENTS

| CN | 103560968 | 2/2014 |
| CN | 103731349 | 4/2014 |

(Continued)

OTHER PUBLICATIONS

Notification on Grant of Patent Right for Invention issued in corresponding Chinese application No. 201710355369.8, dated Nov. 14, 2019.

(Continued)

*Primary Examiner* — Ayanah S George
(74) *Attorney, Agent, or Firm* — Norton Rose Fulbright US LLP (57) ABSTRACT

A packet-transmission method, a local edge device and a machine-readable storage medium are provided. The method includes: receiving a first notification message from an opposite edge device, parsing out a first host route from the first notification message, and adding a first forwarding table entry to a software forwarding table, wherein the first forwarding table entry includes a correspondence between the first host route and an interface receiving the first notification message; inquiring, after receiving a packet, a hardware forwarding table according to a destination address of the packet, if there is no forwarding table entry matched with the destination address in the hardware forwarding table, inquiring the software forwarding table according to the destination address of the packet, if there is a forwarding table entry matched with the destination address in the software forwarding table, sending the packet according to the forwarding table entry matched with the destination address.

15 Claims, 3 Drawing Sheets

(51) Int. Cl.
*H04L 12/725* (2013.01)
*H04L 12/741* (2013.01)

(52) U.S. Cl.
CPC ............ *H04L 45/02* (2013.01); *H04L 45/302* (2013.01); *H04L 45/54* (2013.01); *H04L 45/745* (2013.01)

(56) References Cited

U.S. PATENT DOCUMENTS

| | | |
|---|---|---|
| 2015/0006953 A1 | 1/2015 | Holbrook et al. |
| 2015/0358232 A1 | 12/2015 | Chen et al. |
| 2016/0043950 A1* | 2/2016 | Vobbilisetty .......... H04L 45/745 370/392 |
| 2016/0087885 A1 | 3/2016 | Tripathi et al. |
| 2017/0373973 A1* | 12/2017 | Bickhart ............... H04L 45/741 |

FOREIGN PATENT DOCUMENTS

| | | |
|---|---|---|
| CN | 104243318 | 12/2014 |
| CN | 104243630 | 12/2014 |
| CN | 105376154 | 3/2016 |
| CN | 105591923 | 5/2016 |

OTHER PUBLICATIONS

International Search Report and Written Opinion issued in corresponding International Application No. PCT/CN2018/083573, dated Jun. 27, 2018.

Extended European Search Report issued in Corresponding EP Application No. 18801795.8, dated Mar. 11, 2020.

* cited by examiner

PACKET TRANSMISSION

CROSS-REFERENCE TO RELATED APPLICATION

The present application is a national phase under 35 U.S.C. § 371 of International Application No. PCT/CN2018/083573, filed Apr. 18, 2018, which claims priority to the Chinese patent application with the filing No. 201710355369.8, filed with the China National Intellectual Property Administration on May 19, 2017, entitled "Packet Transmission Method and Apparatus", each of which are incorporated herein by reference in their entirety.

BACKGROUND ART

VXLAN (Virtual eXtensible Local Area Network) is a layer 2 VPN (Virtual Private Network) technology based on IP network and using "MAC (Media Access Control) in an UDP (User Datagram Protocol)" encapsulation mode. Based on existing service providers or enterprise IP network, VXLAN can provide layer 2 interconnection for scattered sites, and can provide service isolation for different tenants. VXLAN is mainly used in data center network, and a data center communicates with other data centers or external public network through an edge device.

DETAILED DESCRIPTION OF EMBODIMENTS

Terms, used in embodiments of the present disclosure, merely aim at describing specific embodiments, rather than limiting the present disclosure. A singular form "a (an)", "the" and "this" used in the present disclosure and the claims also aim at including plural form, unless otherwise clearly indicated in the context. It also should be understood that the term "and/or" used in the present text means includes any or all possible combinations of one or more associated listed items.

It should be understood that terms such as first, second, and third may be used in the present disclosure to describe various types of information, the information should not be limited to those terms. These terms are merely used to distinguish information of the same type. For example, without departing from the scope of the present disclosure, first information may also be called as second information. Similarly, second information may also be called as first information. Besides, depending on the context, the word used "if" can be understood as "while . . . ", "when . . . " or "in response to . . . ".

Figure 1:
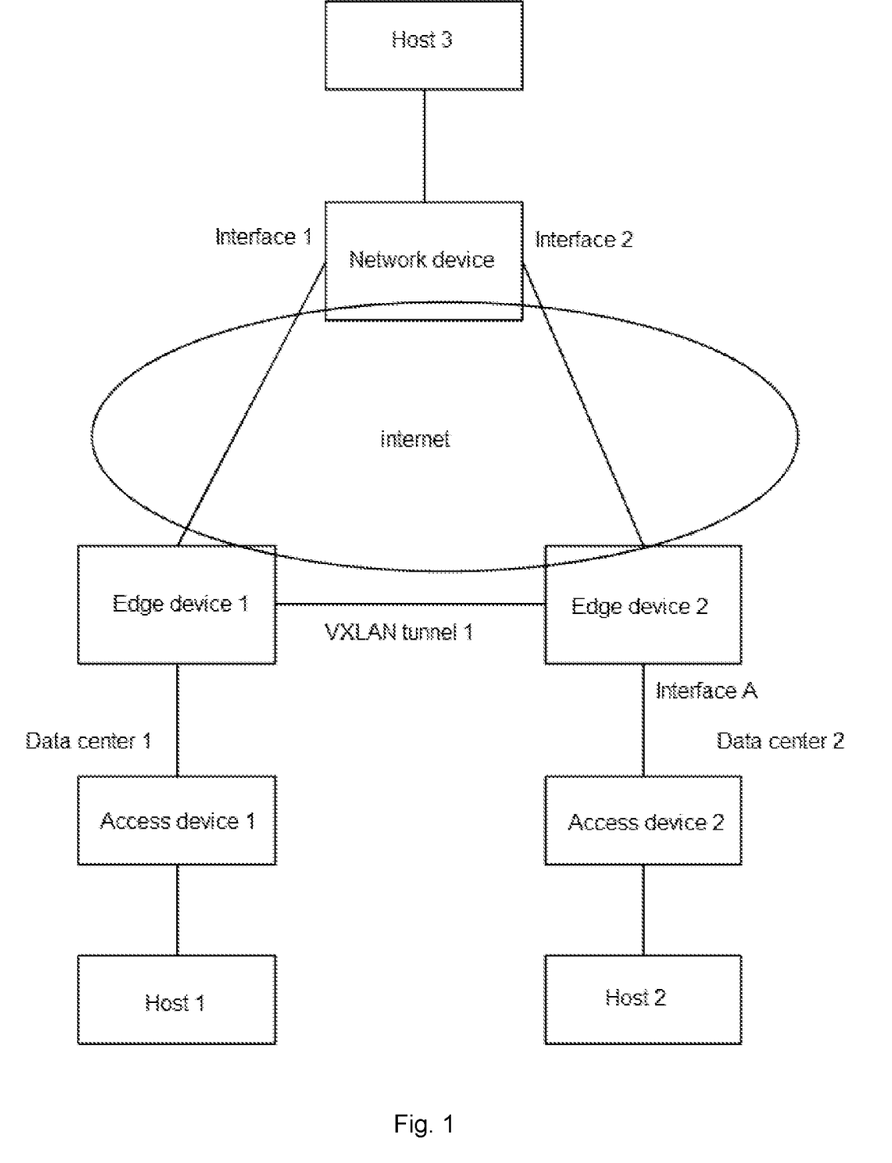
FIG. 1 is a schematic view of a data center network using VXLAN.

Referring to FIG. 1, FIG. 1 shows a schematic view of a network architecture of a data center using VXLAN, wherein a host 1 and an edge device 1 are located in a data center 1, a host 2 and an edge device 2 are located in a center data 2, and a host 3 is located at a public network side. In this scenario, for the sake of security, in conventional technologies, a notification message carrying a host route is merely allowed to be transmitted inside the center data, and the edge device of the data center merely publishes a network segment route in the data center.

For example, assume that the data center 1 uses a network segment 11.1.1.0/24, and the data center 2 uses a segment 11.1.1.0/24, then the edge device 1 of the data center 1 can publish the network segment route 11.1.1.0/24 to a network device of the public network side and to the edge device 2 of the data center 2. The network device, after receiving the network segment route 11.1.1.0/24 through an interface 1, records a correspondence between the network segment route 11.1.1.0/24 and the interface 1 in a forwarding table. The edge device 2, after receiving the network segment route 11.1.1.0/24 through a VXLAN tunnel 1, records a correspondence between the network segment route 11.1.1.0/24 and the VXLAN tunnel 1 in the forwarding table.

Besides, the edge device 2 of the data center 2 can also publish the network segment route 11.1.1.0/24 to a network device and the edge device 1 of the data center 1. The network device, after receiving the network segment route 11.1.1.0/24 through an interface 2, records a correspondence between the network segment route 11.1.1.0/24 and the interface 2 in a forwarding table. The edge device 1, after receiving the network segment route 11.1.1.0/24 through the VXLAN tunnel 1, records the correspondence between the network segment route 11.1.1.0/24 and the VXLAN tunnel 1 in the forwarding table.

Assume that an IP address of the host 1 is 11.1.1.2, an IP address of the host 2 is 11.1.1.3, and the host 3 sends a packet whose destination IP address is 11.1.1.2, after the network device receives this packet, since in the forwarding table there are two forwarding table entries matched with the network segment of the destination IP address 11.1.1.2, one forwarding table entry is selected, and this packet is sent based on this forwarding table entry. Assume that this packet is sent through the interface 2, the packet can be sent to the edge device 2.

Since the forwarding table of the edge device 2 only includes the forwarding table entry corresponding to the network segment 11.1.1.0/24, and does not include the forwarding table entry matched with the specific destination IP address 11.1.1.2, broadcast flood is performed in the data center 2, thus occupying a lot of bandwidth resources of the data center 2, moreover, the packet cannot be sent to the host 1, causing the service of the host 1 to be interrupted, and affecting users' using experience.

Therefore, an embodiment of the present disclosure provides a solution addressing the above problems. Below, the solution of the present embodiment is illustrated in detail.

An embodiment of the present disclosure provides a packet transmission method. This method can be applied to a system including a local edge device and an opposite edge device, the local edge device and the opposite edge device can be located in different data centers, and an EVPN (Ethernet Virtual Private Network) neighbor is established between the local edge device and the opposite edge device. In one example, the local edge device and the opposite edge device each can be a VTEP (VXLAN Tunnel End Point) device, and the local edge device and the opposite edge device are connected through a VXLAN tunnel.

In one example, in each data center, besides the edge device (for example, the local edge device or the opposite edge device), an access device (for example, a router or a switch) and a host (for example, a virtual machine) can be further included, wherein the access device is connected to the edge device, and the access device is connected to the host. Moreover, besides the data center, the system can further include a network device (for example, a router or a switch) and a host at a public network side.

In one example, the local edge device and the opposite edge device can be opposite to each other, for example, when the edge device 1 is located in the data center 1, the edge device 2 is located in the data center 2, and when an EVPN neighbor is established between the edge device 1 and the edge device 2, the edge device 1 is the local edge device, and the edge device 2 is the opposite edge device, or the edge device 2 is the local edge device, and the edge device 1 is the opposite edge device.

In one example, the data center where the local edge device is located and the data center where the opposite edge device is located may use the same network segment, or may also use different network segments. For example, the data center where the local edge device is located and the data center where the opposite edge device is located both use the network segment 11.1.1.0/24.

Referring to FIG. 1, showing a schematic view of one use scenario of an example of the present disclosure, a data center 1 can include a host 1, an access device 1, and an edge device 1, a data center 2 can include a host 2, an access device 2, and an edge device 2, and a public network side includes a network device and a host 3. Moreover, it is assumed that the data center 1 uses a network segment 11.1.1.0/24, and the data center 2 uses the network segment 11.1.1.0/24. In the present use scenario, the description is made by taking the edge device 1 as the opposite edge device and the edge device 2 as the local edge device as an example. Of course, in practical use, it is also possible that the edge device 1 is the local edge device, and the edge device 2 is the opposite edge device.

In the present use scenario, an EVPN neighbor can be established between the edge devices of different data centers, while no EVPN neighbor is established between the edge devices of the data centers and the network device of the public network side. On this basis, since the edge device 1 and the edge device 2 are both edge devices of the data centers, the EVPN neighbor can be established between the edge device 1 and the edge device 2, while no EVPN neighbor is established between the edge device 1 and the network device, and no EVPN neighbor is established between the edge device 2 and the network device.

In the above use scenario, the packet transmission method provided in the embodiment of the present disclosure can include a forwarding table maintenance stage and a packet transmission stage. For the forwarding table maintenance stage, the local edge device can maintain a software forwarding table and a hardware forwarding table, and in the packet transmission stage, the local edge device can transmit a packet on the basis of this software forwarding table or this hardware forwarding table. In the above, a forwarding table maintained by a CPU of the local edge device can be called as a software forwarding table, and a forwarding table maintained by a hardware forwarding chip of the local edge device can be called as a hardware forwarding table. Besides, each table entry in the software forwarding table/hardware forwarding table can be called as a forwarding table entry, and this forwarding table entry is configured to record a mapping relation between the route (for example, IP address) and an outbound interface.

In the above, for the process of the local edge device recording the forwarding table entry in the software forwarding table/hardware forwarding table, it can be divided into the following situations: 1. when the local edge device receives a host route sent by the opposite edge device (for the sake of convenient distinction, it is called as a first host route), only a forwarding table entry corresponding to this first host route (for the sake of convenient distinction, the forwarding table entry is called as a first forwarding table entry) is recorded in the software forwarding table. 2. When the local edge device receives a network segment route sent by the opposite edge device, a forwarding table entry corresponding to this network segment route (for the sake of convenient distinction, the forwarding table entry is called as a second forwarding table entry) is recorded in the software forwarding table, and a second forwarding table entry corresponding to this network segment route is recorded in the hardware forwarding table. 3. When the local edge device receives a host route (for the sake of convenient distinction, it is called as a second host route) sent by an access device, a forwarding table entry corresponding to this second host route (for the sake of convenient distinction, the forwarding table entry is called as a third forwarding table entry) is recorded in the software forwarding table, and a third forwarding table entry corresponding to this second host route is recorded in the hardware forwarding table.

Figure 2:
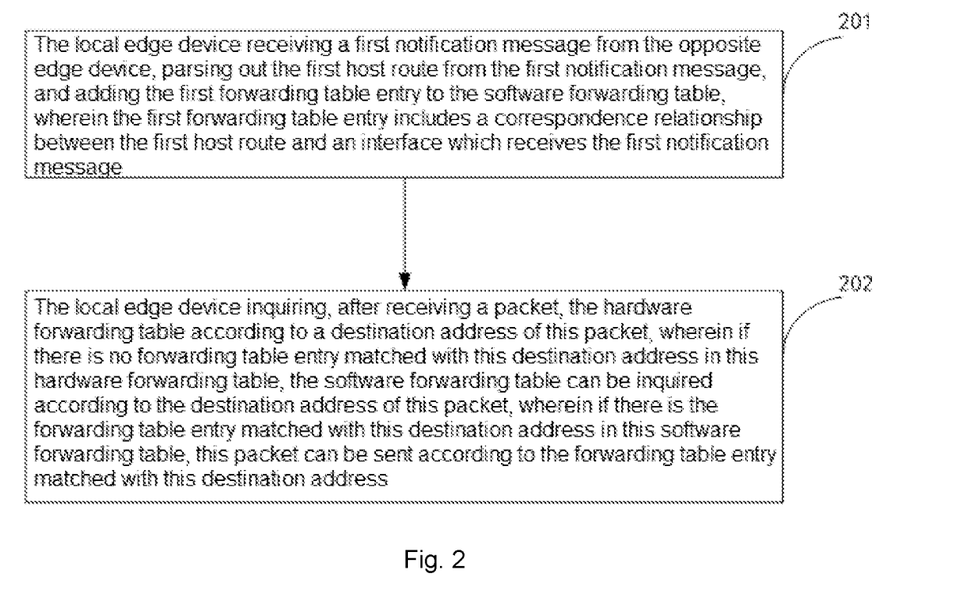
FIG. 2 is a flow chart of a packet transmission method in an embodiment of the present disclosure.

Referring to FIG. 2, showing a flow chart of this packet transmission method, Step 201 is an example of the forwarding table maintenance stage, and Step 202 is an example of the packet transmission stage.

Step 201: the local edge device receives a first notification message from the opposite edge device, parses out the first host route from the first notification message, and adds the first forwarding table entry to the software forwarding table, the first forwarding table entry including a correspondence between this first host route and an interface which receives the first notification message.

Step 202: the local edge device inquires, after receiving the packet, the hardware forwarding table according to a destination address of this packet, wherein if in this hardware forwarding table there is no forwarding table entry matched with this destination address, the software forwarding table can be inquired according to the destination address of this packet, wherein if in this software forwarding table there is the forwarding table entry matched with this destination address, this packet can be sent according to the forwarding table entry matched with this destination address.

Below in combination with the use scenario of FIG. 1, the forwarding table maintenance stage and the packet transmission stage are illustrated.

I. Forwarding table maintenance stage, wherein the forwarding table can include the software forwarding table and the hardware forwarding table.

For the process of the local edge device maintaining the forwarding table, three types of notification messages can be involved, for example, a notification message carrying the host route and sent by the opposite edge device (for the sake of convenient distinction, the notification message is called as a first notification message hereinafter), a notification message carrying a network segment route and sent by the opposite edge device (for the sake of convenient distinction, the notification message is called as a second notification message hereinafter), and a notification message carrying the host route and sent by an access device (the access device located in the same data center as the local edge device) (for the sake of convenient distinction, the notification message is called as a third notification message hereinafter). Below the three types of notification messages are illustrated in detail.

1. The opposite edge device sends the first notification message to the local edge device, with the first notification message carrying the host route.

In one example, the opposite edge device can acquire a first host route of the host in the data center where the opposite edge device is located (for the sake of convenient distinction, it is called as the first host route), and generate the first notification message including the first host route, and send the first notification message to the local edge device, in this way, the local edge device can receive the first notification message carrying the first host route.

Likewise, the local edge device can also acquire a third host route of the host in the data center where the local edge device is located (for the sake of convenient distinction, it is called as the third host route), and generate a fourth notification message including the third host route (for the sake of convenient distinction, it is called as a fourth notification message), and send the fourth notification message to the opposite edge device, in this way, the opposite edge device can receive the fourth notification message carrying the third host route.

Furthermore, the local edge device can parse out, after receiving the first notification message, the first host route from this first notification message, and add the first forwarding table entry to the software forwarding table. This first forwarding table entry can include a correspondence between the first host route and the interface which receives the first notification message, and this interface is usually a tunnel interface, for example, a VXLAN tunnel, between the local edge device and the opposite edge device. Likewise, the opposite edge device can parse out, after receiving the fourth notification message, the third host route from the fourth notification message, and add the forwarding table entry corresponding to the third host route to the software forwarding table. This forwarding table entry can include a correspondence between the third host route and an interface which receives the fourth notification message, and this interface is usually a tunnel interface, for example, a VXLAN tunnel, between the opposite edge device and the local edge device. Therefore, when the destination address of the received packet is the host in the data center where the local edge device is located, the opposite edge device sends this packet to the local edge device according to the third host route.

In one example, the local edge device adds, after receiving the first notification message, the first forwarding table entry only to the software forwarding table, while does not add the first forwarding table entry to the hardware forwarding table.

Below, the above processes are illustrated in combination with the scenario of FIG. 1. The edge device 1 can acquire the host route (for example, 11.1.1.2/32) of the host 1 in the data center 1, and this host route is a 32-bit IP address, rather than a network segment route. Then, the edge device 1 generates a notification message including the host route (11.1.1.2/32), and sends this notification message to the edge device 2. The edge device 2 adds, after receiving the notification message, the forwarding table entry to the software forwarding table, as shown in Table 1, and this forwarding table entry can include a correspondence between the host route (11.1.1.2/32) and the VXLAN tunnel 1 (the VXLAN tunnel between the edge device 1 and the edge device 2).

TABLE 1

| Host Route | Outbound Interface |
|---|---|
| 11.1.1.2/32 | VXLAN Tunnel 1 |

For the process that "the edge device 1 acquires the host route of the host 1 in the data center 1", in one example, since the network segment of an interface of the edge device 1 connected to the access device 1 is 11.1.1.0/24, the edge device 1 can send an ARP (Address Resolution Protocol) request packet through this interface, and the destination IP address of this ARP request packet is the network segment address 11.1.1.0/24. In this way, the host 1 will send, after receiving this ARP request packet, an ARP response packet for this ARP request packet, and the edge device 1 can parse out, after receiving this ARP response packet, an IP address 11.1.1.2 of the host 1, and obtain a host route (11.1.1.2/32) of the host 1. In another example, if the access device 1 received a free ARP packet sent by the host 1, the IP address 11.1.1.2 of the host 1 can be parsed out from the free ARP packet, to further obtain the host route (11.1.1.2/32) of the host 1. Then, the access device 1 sends a notification message carrying the host route (11.1.1.2/32), to the edge device 1, in this way, the edge device 1 can parse out the host route (11.1.1.2/32) of the host 1 from this notification message. In other words, the opposite edge device can actively trigger ARP learning to obtain the first host route of the host in the data center where the opposite edge device is located. The opposite edge device can also obtain the first host route according to the free ARP packet sent by the host in the data center where the opposite edge device is located.

Likewise, the edge device 2 can also acquire the host route of the host 2 in the data center 2 in the above manner.

For the process that "the edge device 1 sends a notification message to the edge device 2", in conventional manners, for the sake of security, the notification message carrying the host route is transmitted merely in the data center, and the notification message carrying the host route will not be sent to other data centers, let alone sending the notification message carrying the host route to the public network side. However, in the embodiment of the present disclosure, the edge device 1 can send the notification message carrying the host route to its own EVPN neighbor, but will not send the notification message carrying the host route to the public network side.

Since there is the EVPN neighbor established between the edge device 1 and the edge device 2, the edge device 1 sends the notification message carrying the host route (11.1.1.2/32) to the edge device 2. Since there is no EVPN neighbor established between the edge device 1 and the network device at the public network side, the edge device 1 does not send the notification message carrying the host route (11.1.1.2/32) to the network device. Of course, if the edge device 1 has other EVPN neighbors, the notification message carrying the host route (11.1.1.2/32) can also be sent to the other EVPN neighbors.

Likewise, the edge device 2 can acquire the host route (for example, 11.1.1.3/32) of the host 2 in the data center 2, generate a notification message including the host route (for example, 11.1.1.3/32), and send this notification message to the edge device 1, but does not send this notification message to the network device at the public network side. The edge device 1 adds, after receiving the notification message, the forwarding table entry to the software forwarding table, and this forwarding table entry includes a correspondence between the host route (11.1.1.3/32) and the VXLAN tunnel 1 (the VXLAN tunnel between the edge device 2 and the edge device 1).

In one example, for the process that "the local edge device adds the first forwarding table entry (the correspondence between the first host route and the VXLAN tunnel) to the software forwarding table", it includes, but not limited to, the following manner: if the first notification message carries a preset tag and/or a source address of the first notification message is located in a neighbor table, the first forwarding table entry is added to the software forwarding table, wherein the preset tag indicates the first notification message carrying the host route; the neighbor table is configured to record an address of the edge device which is an EVPN neighbor of the local edge device and located in another data center. Below the above processor are illustrated in detail in combination with several specific manners.

Manner A: the local edge device inquires whether the first notification message carries the preset tag, where if yes, the first forwarding table entry is added to the software forwarding table, and if not, the first forwarding table entry is not added to the software forwarding table. In the above, the preset tag is configured to indicate that the first notification message carries the host route.

Likewise, the fourth notification message including the third host route and sent by the local edge device to the opposite edge device can also carry a preset tag, such that the opposite edge device can record the forwarding table entry corresponding to the third host route in the software forwarding table according to this preset tag.

For example, when the edge device 1 sends the notification message carrying the host route, (11.1.1.2/32) to the edge device 2, a preset tag (for example, AAA, etc.) is added to this notification message to indicate that this notification message carries the host route. In this way, the edge device 2 can obtain by querying (inquiring) that the first notification message carries the preset tag, and add to the software forwarding table a forwarding table entry including the host route (11.1.1.2/32) and the VXLAN tunnel 1.

Manner B: the local edge device inquires whether a source address (i.e. the address of the opposite edge device) of the first notification message is located in a neighbor table, wherein if yes, the first forwarding table entry can be added to the software forwarding table, and if not, the first forwarding table entry is not added to the software forwarding table. In the above, the neighbor table is configured to record an address of an edge device which is an EVPN neighbor of the local edge device and is located in another data center.

For example, since the edge device 1 and the edge device 2 are EVPN neighbors, thus, the address (for example, IP address) of the edge device 1 can be recorded in the neighbor table of the edge device 2, on this basis, the edge device 2 can obtain by query that the source address of the first notification message is located in the neighbor table, and add to the software forwarding table the forwarding table entry including the host route (11.1.1.2/32) and the VXLAN tunnel 1. Besides, if the source address of this first notification message is not located in the neighbor table, it means that the opposite edge device (i.e. the edge device 1) is not an EVPN neighbor of the edge device 2, at which time it is unnecessary to add the first forwarding table entry to the software forwarding table.

Manner C: the local edge device inquires whether the first notification message carries a preset tag, wherein if not, the first forwarding table entry is not added to the software forwarding table, and if yes, the local edge device inquires whether the source address (i.e. the address of the opposite edge device) of the first notification message is located in the neighbor table, wherein if not, the first forwarding table entry is not added to the software forwarding table, and if yes, the first forwarding table entry is added to the software forwarding table.

Manner D: the local edge device inquires whether the source address (i.e. the address of the opposite edge device) of the first notification message is located in the neighbor table, wherein if not, the first forwarding table entry is not added to the software forwarding table, and if yes, the local edge device inquires whether the first notification message carries the preset tag, wherein if not, the first forwarding table entry is not added to the software forwarding table, and if yes, the first forwarding table entry is added to the software forwarding table.

2. The opposite edge device sends the second notification message carrying the network segment route to the local edge device.

In one example, the opposite edge device can acquire a network segment (for example, a segment of an interface on the opposite edge device connected to an access device in the present data center, for example, a network segment 11.1.1.0/24) used by the data center where the opposite edge device itself is located, and sends to the local edge device the second notification message carrying this network segment route. For example, the edge device 1 and the edge device 2 can notify each other EVPN route information therebetween through Multiprotocol-Border Gateway Protocol (MP-BGP for short).

In this way, the local edge device can receive the second notification message from the opposite edge device, parse out the network segment route from the second notification message, and add the second forwarding table entry to the software forwarding table and to the hardware forwarding table, this second forwarding table entry including a correspondence between this network segment route and an interface which receives the second notification message. This interface is usually a tunnel interface, for example, a VXLAN tunnel, between the local edge device and the opposite edge device.

In one example, after receiving the second notification message, the local edge device adds the second forwarding table entry to the software forwarding table, and also adds the second forwarding table entry to the hardware forwarding table.

Below, the above process is illustrated in combination with the scenario of FIG. 1. The edge device 1 can acquire the network segment 11.1.1.0/24 of the data center 1, generate a notification message including the network segment route (11.1.1.0/24), and send this notification message to the edge device 2. The edge device 2 adds, after receiving this notification message, the forwarding table entry to the software forwarding table and the hardware forwarding table, and this forwarding table entry can include a correspondence between the network segment route (11.1.1.0/24) and the VXLAN tunnel 1 (a VXLAN tunnel between the edge device 1 and the edge device 1).

The edge device 2 can also send to the edge device 1 the notification message carrying the network segment route (11.1.1.0/24), and the edge device 1 adds the forwarding table entry to the software forwarding table and to the hardware forwarding table, which is not repeated redundantly herein.

In one example, for the process that "the edge device 1 sends to the edge device 2 the notification message carrying the network segment route", the edge device 1 may end the notification message carrying the network segment route to its own EVPN neighbor, or may also send the notification message carrying the network segment route to the network device at the public network side, or may also send the notification message carrying the network segment route to other edge devices which are not EVPN neighbors. No limitation is made thereto.

The network device can record, after receiving through the interface 1 the notification message carrying the network segment route 11.1.1.0/24 sent by the edge device 1, a correspondence between the network segment route 11.1.1.0/24 and the interface 1 in the forwarding table. The network device can record, after receiving through the interface 2 the notification message carrying the network segment route 11.1.1.0/24 sent by the edge device 2, a correspondence between the segment route 11.1.1.0/24 and the interface 2 in the forwarding table.

3. The access device sends to the local edge device a third notification message carrying the host route.

In one example, the access device can send, after acquiring a second host route of a host in the data center where the present access device is located (for the sake of convenient distinction, it is called as a second host route), a third notification message carrying this second host route to the local edge device of this data center. In this way, the local edge device can receive the third notification message from the access device, parse out the second host route from this third notification message, and add the third forwarding table entry to the software forwarding table and to the hardware forwarding table, the third forwarding table entry including a correspondence between the second host route and an interface which receives the third notification message. In the above, this interface usually can be an interface between the local edge device and the access device, and it may not be a VXLAN tunnel.

In one example, after receiving the third notification message, the local edge device adds the third forwarding table entry to the software forwarding table, and also adds the third forwarding table entry to the hardware forwarding table.

Below, the above processes are illustrated in combination with the scenario of FIG. 1. The access device 2 can parse out, after receiving a free ARP packet sent by the host 2, the IP address 11.1.1.3 from the free ARP packet, to further obtain the host route (11.1.1.3/32), and send to the edge device 2 a notification message carrying the host route (11.1.1.3/32), in this way, the edge device 2 can parse out the host route (11.1.1.3/32) from this notification message, and adds the forwarding table entry to the software forwarding table and to the hardware forwarding table. This forwarding table entry can include a correspondence between the host route (11.1.1.3/32) and an interface A (an interface between the edge device 2 and the access device 2).

In other words, the local edge device can actively trigger ARP learning, send an ARP learning packet, and obtain the third host route of the host in the data center where the local edge device is located. The local edge device can also receive the free ARP packet sent by the host in the data center where this local edge device is located, and obtains the third host route upon parsing.

The above processes are a process of the local edge device maintaining the forwarding tables (the software forwarding table and the hardware forwarding table).

II. Packet transmission stage, used for transmitting packets using the software forwarding table or the hardware forwarding table.

In one example, since the local edge device maintains the software forwarding table (maintained by the CPU) and the hardware forwarding table (maintained by the hardware forwarding chip), for the process of the local edge device transmitting packets, the local edge device can firstly inquire the hardware forwarding table through the destination address (for example, destination IP address) of this packet (for example, after the hardware forwarding chip receives the packet, the hardware forwarding table is inquired through this destination address). If in this hardware forwarding table there is the forwarding table entry matched with this destination address, this packet is sent according to the forwarding table entry matched with this destination address. If in this hardware forwarding table there is no forwarding table entry matched with this destination address, the local edge device inquires the software forwarding table through this destination address (for example, the hardware forwarding chip sends the packet upwards to the CPU, and the CPU inquires the software forwarding table through this destination address). If in this software forwarding table there is the forwarding table entry matched with this destination address, this packet is sent according to the forwarding table entry matched with this destination address, and if in this software forwarding table there is no forwarding table entry matched with this destination address, this packet is discarded.

Below, the above processes are illustrated in combination with the scenario of FIG. 1. Assume that the host 3 sends a packet whose destination IP address is 11.1.1.2, after the network device receives this packet, since the forwarding table includes the correspondence between the network segment route 11.1.1.0/24 and the interface 1, and the correspondence between the network segment route 11.1.1.0/24 and the interface 2, the network device can choose one of the forwarding table entries, and assume choosing the forwarding table entry corresponding to the correspondence between the network segment route 11.1.1.0/24 and the interface 2, the network device can send this packet through the interface 2.

After the hardware forwarding chip of the edge device 2 receives this packet, the hardware forwarding table is inquired through the destination IP address 11.1.1.2, as shown in Table 2, which is one example of the hardware forwarding table. A first forwarding table entry is generated based on "the third notification message carrying the host route (11.1.1.3/32) and sent by the access device to the edge device 2", a second forwarding table entry is generated based on "the second notification message carrying the segment route (11.1.1.0/24) and sent by the edge device 1 to the edge device 2", and a third forwarding table entry is generated after the edge device 2 acquires that the network segment of the interface A is 11.1.1.0/24. Since the destination IP address 11.1.1.2 can be matched with the second forwarding table entry and the third forwarding table entry, and the two forwarding table entries have the same network segment route but different outbound interfaces, the matching is considered to be wrong, that is, in the hardware forwarding table there is no forwarding table entry matched with this destination IP address 11.1.1.2, and the hardware forwarding chip can send this packet upwards to the CPU.

TABLE 2

| Host Route | Outbound Interface |
| --- | --- |
| 11.1.1.3/32 | Interface A |
| 11.1.1.0/24 | VXLAN Tunnel 1 |
| 11.1.1.0/24 | Interface A |

After the CPU of the edge device 2 receives this packet, the software forwarding table is inquired according to the destination IP address 11.1.1.2, as shown in Table 3, which is one example of the software forwarding table. Generating processes of a second forwarding table entry, a third forwarding table entry, and a fourth forwarding table entry are similar to those in Table 2, and will not be repeated redundantly herein, while the first forwarding table entry is generated based on "the first notification message carrying the host route (11.1.1.2/32) and sent by the edge device 1 to the edge device 2". Since the destination IP address 11.1.1.2 can be matched with the first forwarding table entry (using the longest mask matching principle, a mask of 11.1.1.2/32 has 32 bits, and a mask of 11.1.1.0/24 has 24 bits, therefore, the destination IP address only can be matched with only the first forwarding table entry), there is the forwarding table entry matched with this destination IP address 11.1.1.2 in the software forwarding table, the CPU can send this packet according to the outbound interface (i.e. the VXLAN tunnel 1) of this forwarding table entry, in this way, this packet is sent to the edge device 1. The edge device 1 can finally send, after receiving this packet, the packet to the host 1, thus the packet transmission process is completed.

TABLE 3

| Host Route | Outbound Interface |
| --- | --- |
| 11.1.1.2/32 | VXLAN Tunnel 1 |
| 11.1.1.3/32 | Interface A |
| 11.1.1.0/24 | VXLAN Tunnel 1 |
| 11.1.1.0/24 | Interface A |

For the process that the hardware forwarding chip sends the packet upwards to the CPU, in order to reduce the influence of a lot of packets to the CPU, a buffer queue also can be built, and the hardware forwarding chip can store the packet in the buffer queue, and the CPU reads the packet from the buffer queue according to its own performance, instead of the case that a lot of packets are directly sent to the CPU, thus reducing the impacts of a lot of packets on the CPU processing performance, and avoiding overload of the CPU.

In one example, when in the software forwarding table there is the forwarding table entry matched with the destination address, the forwarding table entry matched with this destination address can also be added to the hardware forwarding table. For example, the CPU also can add, after sending the packet according to the forwarding table entry (the correspondence between 11.1.1.2/32 and the VXLAN tunnel 1) in the software forwarding table, the forwarding table entry (the correspondence between 11.1.1.2/32 and the VXLAN tunnel 1) to the hardware forwarding table. In this way, the hardware forwarding chip can directly use, after again receiving the packet with the destination IP address 11.1.1.2, the forwarding table entry (the correspondence between 11.1.1.2/32 and the VXLAN tunnel 1) to forward the packet, without sending the packet to the CPU, thus the processing load of the CPU can be reduced.

Moreover, in the above manner, the forwarding table entry (the correspondence between 11.1.1.2/32 and the VXLAN tunnel 1) is not directly added to the hardware forwarding table, but after the packet matched with this forwarding table entry is received, this forwarding table entry (the correspondence between 11.1.1.2/32 and the VXLAN tunnel 1) is added to the hardware forwarding table, thus the table entry resource of the hardware forwarding chip can be saved, and the waste of table entry resource is avoided.

Based on the above technical solution, in the embodiments of the present disclosure, the local edge device can add, after receiving the first notification message from the opposite edge device, to the software forwarding table the forwarding table entry corresponding to the first host route, in this way, after the packet matched with the first host route is received, the packet can be sent to the opposite edge device through the forwarding table entry corresponding to the first host route, so that the opposite edge device sends the packet to the host. In the above processes, broadcasting this packet in the data center of the local edge device can be avoided, saving the bandwidth resources of the data center, avoiding interruption of the service of the host, and improving the user's using experience. Moreover, the local edge device adds the forwarding table entry corresponding to the first host route to the software forwarding table maintained by the CPU (Central Processing Unit), rather than adding the forwarding table entry corresponding to the first host route to the hardware forwarding table maintained by the hardware forwarding chip, thus saving the table entry resources of the hardware forwarding chip.

Figure 3:
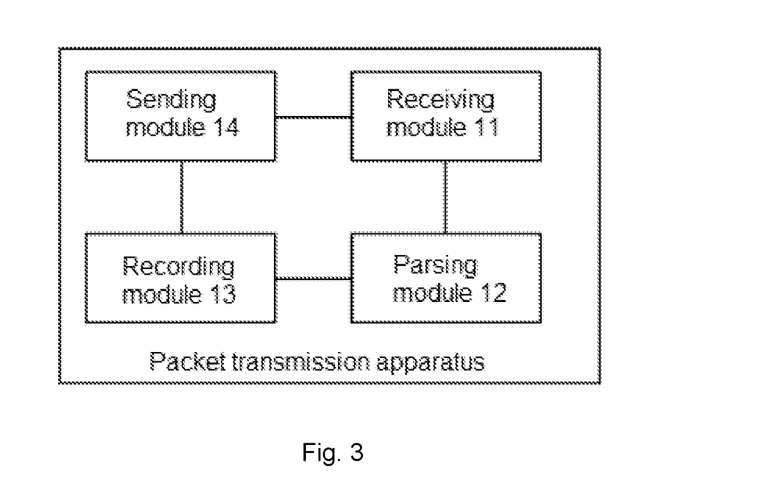
FIG. 3 is a structural view of a packet transmission apparatus in an embodiment of the present disclosure.

Based on the same application concept as the above method, an embodiment of the present application further provides a packet transmission apparatus. This packet transmission apparatus can be applied to a local edge device. As shown in FIG. 3, this apparatus can include:

a receiving module 11, configured to receive a first notification message from an opposite edge device;

a parsing module 12, configured to parse a first host route from the first notification message;

a recording module 13, configured to add a first forwarding table entry to a software forwarding table, the first forwarding table entry including a correspondence between the first host route and an interface which receives the first notification message; and a sending module 14, configured to inquire, after the packet is received, the hardware forwarding table according to a destination address of the packet, wherein if in the hardware forwarding table there is no forwarding table entry matched with the destination address, the software forwarding table is inquired according to the destination address of the packet, wherein if in the software forwarding table there is the forwarding table entry matched with the destination address, the packet is sent according to the forwarding table entry matched with the destination address.

The recording module 13 is specifically configured to add, in a process of adding a first forwarding table entry to a software forwarding table, the first forwarding table entry to the software forwarding table if the first notification message carries a preset tag and/or a source address of the first notification message is located in a neighbor table, wherein the preset tag indicates that the first notification message carries the host route; the neighbor table is configured to record an address of an edge device which is an Ethernet Virtual Private Network (EVPN) neighbor of the local edge device and located in another data center.

In one example, the receiving module 11 is further configured to receive a second notification message from the opposite edge device;

the parsing module 12 is further configured to parse out a network segment route from the second notification message; and the recording module 13 is further configured to add a second forwarding table entry to the hardware forwarding table, the second forwarding table entry including a correspondence between the network segment route and an interface which receives the second notification message.

In one example, the receiving module 11 is further configured to receive a third notification message from an access device;

the parsing module 12 parses out a second host route from the third notification message;

the recording module 13 is further configured to add a third forwarding table entry to the hardware forwarding table, the third forwarding table entry including a correspondence between the second host route and an interface which receives the third notification message; and the recording module 13 is further configured to add a forwarding table entry matched with the destination address to the hardware forwarding table when there is the forwarding table entry matched with the destination address in the software forwarding table.

In one example, the sending module 14 is further configured to acquire a third host route of the host in the data center where the local edge device is located, generate a fourth notification message including the third host route, and send the fourth notification message to the opposite edge device, such that the opposite edge device adds the forwarding table entry corresponding to the third host route to the software forwarding table.

Figure 4:
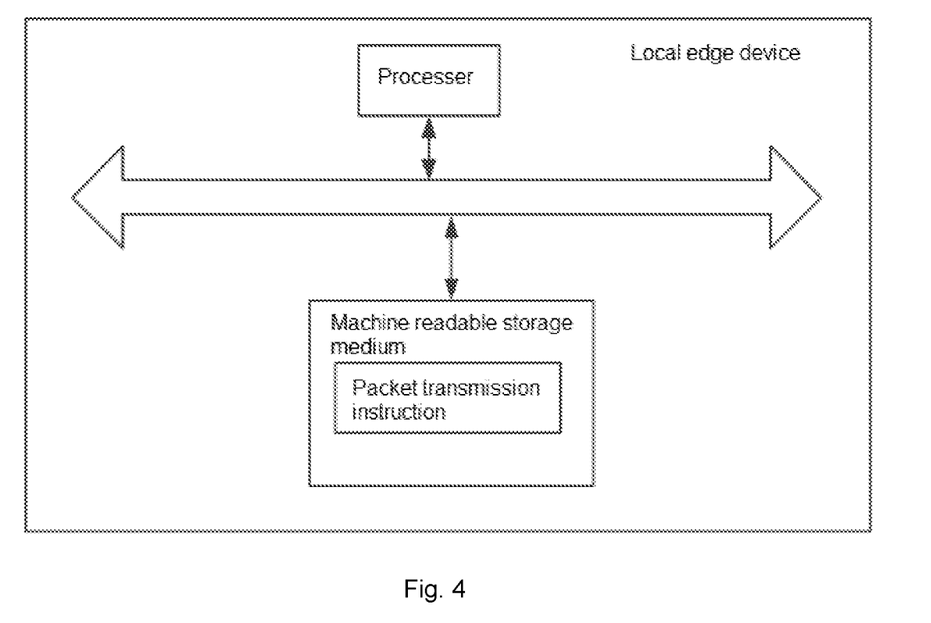
FIG. 4 is a structural view of hardware of a local edge device in an embodiment of the present disclosure.

For the local edge device provided in the embodiment of the present application, in the aspect of hardware, a schematic view of its hardware architecture is shown in FIG. 4. FIG. 4 is a schematic view of a hardware structure of the local edge device provided in an embodiment of the present application. The local edge device includes: a machine readable storage medium and a processor, wherein the machine readable storage medium stores machine-executable instruction codes, for example, software functional modules or computer programs included in the packet transmission apparatus provided in the embodiment of the present disclosure.

The processor and the machine readable storage medium can communicate through a system bus, and the processor enables the local edge device to implement the packet transmission operation disclosed in the above examples of the present application by reading and executing the machine-executable instruction codes corresponding to packet transmission logic and stored in the machine readable storage medium.

Herein, the machine readable storage medium can be any electronic, magnetic, optical or other physical storage means, and can contain or store information, for example, executable instructions and data, etc. For example, the machine readable storage medium can be: RAM (Random Access Memory), volatile memory, nonvolatile memory, flash memory, memory driver (for example, hard disk driver), solid state disk, any type of memory disk (for example, optical disk, DVD, etc.), or similar storage media, or their combinations.

The system, apparatus, module or unit illustrated in the above examples can be specifically realized by computer chips or entities, or can be realized by a product having certain functions. A typical implementation device is a computer, and a specific form of the computer can be personal computer, laptop computer, cellphone, camera phone, smart phone, person digital assistant, media player, navigation device, e-mail transceiver device, game console, tablet computer, wearable device or any combination of several devices among these devices.

For convenient description, when the above apparatus is described, it is divided into various units according to the functions to be described respectively. Of course, when the present disclosure is implemented, the functions of various units can be realized in the same or a plurality of pieces of software and/or hardware.

As will be appreciated by one skilled in the art, the embodiments of the present disclosure may provide a method, a system, or a computer program product. Accordingly, the present disclosure may take the form of an entirely hardware embodiment, an entirely software embodiment, or an embodiment combining software and hardware aspects. Furthermore, the embodiments of the present disclosure may take the form of a computer program product embodied on one or more computer-usable storage mediums (including, but not limited to, magnetic disk memories, CD-ROMs, optical memories, etc.) containing computer-usable program codes embodied therein.

The present disclosure is described with reference to flowcharts and/or block diagrams of methods, apparatuses (systems) and computer program products according to embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus, such that the functions specified in the flowchart flow or flows and/or block diagram block or blocks are implemented through the instructions executed by the processor of the computer or other programmable data processing apparatus.

Furthermore, these computer program instructions may also be stored in a computer-readable memory that can direct a computer or other programmable data processing apparatus to operate in a particular manner, such that the instructions stored in the computer-readable memory form instruction means which implement the functions specified in the flowchart flow or flows and/or block diagram block or blocks.

These computer program instructions may also be loaded onto a computer or other programmable data processing apparatus to cause a series of operational steps to be performed on the computer or other programmable apparatus to produce a computer implemented process such that the functions specified in the flowchart flow or flows and/or block diagram block or blocks are implemented through the instructions executed on the computer or other programmable apparatus.

As will be appreciated by one skilled in the art, the embodiments of the present disclosure may provide a method, a system, or a computer program product. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage mediums (which may include, but not limited to, magnetic disk memories, CD-ROMs, optical memories, etc.) containing computer-usable program codes embodied therein.

The above description is merely illustrative of the embodiments of the present disclosure and is not intended to limit the present disclosure. It would be understood by one skilled in the art that various modifications and variations can be made to the present disclosure. Any modifications, equivalent substitutions, improvements and so on made within the spirit and principle of the present disclosure should be included in the scope of the claims of the present disclosure.

INDUSTRIAL APPLICABILITY

In the embodiments of the present disclosure, the local edge device can add, after receiving the first notification message from the opposite edge device, to the software forwarding table the forwarding table entry corresponding to the first host route, in this way, after the packet matched with the first host route is received, the packet can be sent to the opposite edge device through the forwarding table entry corresponding to the first host route, such that the opposite edge device sends the packet to the host. In the above process, broadcasting this packet in the data center of the local edge device can be avoided, saving the bandwidth resources of the data center, avoiding interruption of the service of the host, and improving the user's using experience. Moreover, the local edge device adds the forwarding table entry corresponding to the first host route to the maintained software forwarding table, rather than adding the forwarding table entry corresponding to the first host route to the hardware forwarding table maintained by the hardware forwarding chip, thus saving the table entry resource of the hardware forwarding chip.

The invention claimed is:

1. A method for transmitting packets, wherein an Ethernet Virtual Private Network (EVPN) neighbor is established between a local edge device and an opposite edge device, the local edge device and the opposite edge device are located in different data centers, the method comprising:
   receiving, by the local edge device, a first notification message from an opposite edge device, parsing out a first host route from the first notification message, and adding a first forwarding table entry to a software forwarding table, wherein the first forwarding table entry is not added to a hardware forwarding table, wherein the first forwarding table entry comprises a correspondence between the first host route and an interface receiving the first notification message; and
   inquiring, by the local edge device, after receiving a packet, a hardware forwarding table according to a destination address of the packet, if there is no forwarding table entry matched with the destination address in the hardware forwarding table, inquiring the software forwarding table according to the destination address of the packet, if there is a forwarding table entry matched with the destination address in the software forwarding table, sending the packet according to the forwarding table entry matched with the destination address.

2. The method of claim 1, wherein the adding a first forwarding table entry to a software forwarding table comprises:
   adding, if the first notification message carries a preset tag, the first forwarding table entry to the software forwarding table, wherein the preset tag indicates that the first notification message carries a host route.

3. The method of claim 1, wherein the adding a first forwarding table entry to a software forwarding table comprises:
   adding, if a source address of the first notification message is located in a neighbor table, the first forwarding table entry to the software forwarding table, wherein the neighbor table is used to record an address of an edge device which is an Ethernet Virtual Private Network (EVPN) neighbor of the local edge device and located in another data center.

4. The method of claim 1, wherein the method further comprises:
   receiving a second notification message from the opposite edge device, parsing out a network segment route from the second notification message, and adding a second forwarding table entry to the hardware forwarding table, wherein the second forwarding table entry comprises a correspondence between the network segment route and an interface receiving the second notification message.

5. The method of claim 1, wherein the method further comprises:
   receiving a third notification message from an access device, parsing out a second host route from the third notification message, and adding a third forwarding table entry to the hardware forwarding table, wherein the third forwarding table entry comprises a correspondence between the second host route and an interface receiving the third notification message.

6. The method of claim 1, wherein the method further comprises:
   adding, when there is the forwarding table entry matched with the destination address in the software forwarding table, the forwarding table entry matched with the destination address to the hardware forwarding table.

7. The method of claim 1, wherein the method further comprises:
   acquiring a third host route of a host in a data center where the local edge device is located, generating a fourth notification message comprising the third host route, and sending the fourth notification message to the opposite edge device, such that the opposite edge device adds a forwarding table entry corresponding to the third host route to the software forwarding table.

8. A local edge device, comprising a processor and a non-transitory machine readable storage medium, the non-transitory machine readable storage medium storing machine-executable instructions executable by the processor, wherein an Ethernet Virtual Private Network (EVPN) neighbor is established between the local edge device and an opposite edge device, the local edge device and the opposite edge device are located in different data centers, and the processor being driven by the machine-executable instructions to:
   receive a first notification message from an opposite edge device, parse out a first host route from the first notification message, and add a first forwarding table entry to a software forwarding table, wherein the first forwarding table entry is not added to a hardware forwarding table, wherein the first forwarding table entry comprises a correspondence between the first host route and an interface receiving the first notification message; and
   inquire, after receiving a packet, a hardware forwarding table according to a destination address of the packet, if there is no forwarding table entry matched with the destination address in the hardware forwarding table, inquire the software forwarding table according to the destination address of the packet, if there is a forwarding table entry matched with the destination address in the software forwarding table, send the packet according to the forwarding table entry matched with the destination address.

9. The local edge device of claim 8, wherein when the first forwarding table entry is added to the software forwarding table, the processor is driven by the machine-executable instructions to:
add, if the first notification message carries a preset tag, the first forwarding table entry to the software forwarding table, wherein the preset tag indicates that the first notification message carries a host route.

10. The local edge device of claim 8, wherein when the first forwarding table entry is added to the software forwarding table, the processor is driven by the machine-executable instructions to:
add, if a source address of the first notification message is located in a neighbor table, the first forwarding table entry to the software forwarding table, wherein the neighbor table is used to record an address of an edge device which is an Ethernet Virtual Private Network (EVPN) neighbor of the local edge device and located in another data center.

11. The local edge device of claim 8, wherein the processor is further driven by the machine-executable instructions to:
receive a second notification message from the opposite edge device, parse out a network segment route from the second notification message, and add a second forwarding table entry to the hardware forwarding table, wherein the second forwarding table entry comprises a correspondence between the network segment route and an interface receiving the second notification message.

12. The local edge device of claim 8, wherein the processor is further driven by the machine-executable instructions to:
receive a third notification message from an access device, parse out a second host route from the third notification message, and add a third forwarding table entry to the hardware forwarding table, wherein the third forwarding table entry comprises a correspondence between the second host route and an interface receiving the third notification message.

13. The local edge device of claim 8, wherein the processor is further driven by the machine-executable instructions to:
add, when there is the forwarding table entry matched with the destination address in the software forwarding table, the forwarding table entry matched with the destination address to the hardware forwarding table.

14. The local edge device of claim 8, wherein the processor is further driven by the machine-executable instructions to:
acquire a third host route of a host in a data center where the local edge device is located, generate a fourth notification message comprising the third host route, and send the fourth notification message to the opposite edge device, such that the opposite edge device adds a forwarding table entry corresponding to the third host route to the software forwarding table.

15. A non-transitory machine readable storage medium, storing machine-executable instructions, wherein the machine-executable instructions are configured to drive, when being called and executed by a processor, the processor to:
receive a first notification message from an opposite edge device, parse out a first host route from the first notification message, and add a first forwarding table entry to a software forwarding table, wherein the first forwarding table entry is not added to a hardware forwarding table, wherein the first forwarding table entry comprises a correspondence between the first host route and an interface receiving the first notification message; and
inquire, after receiving a packet, a hardware forwarding table according to a destination address of the packet, if there is no forwarding table entry matched with the destination address in the hardware forwarding table, inquire the software forwarding table according to the destination address of the packet, if there is a forwarding table entry matched with the destination address in the software forwarding table, send the packet according to the forwarding table entry matched with the destination address;
wherein an Ethernet Virtual Private Network (EVPN) neighbor is established between a local edge device and an opposite edge device, the local edge device and the opposite edge device are located in different data centers.

* * * * *